UNITED STATES PATENT OFFICE.

J. J. REEVES, OF SULPHUR SPRINGS, TEXAS.

MEDICAL COMPOUND.

Specification forming part of Letters Patent No. 28,904, dated June 26, 1860.

*To all whom it may concern:*

Be it known that I, JOSEPH J. REEVES, of Sulphur Springs, in the county of Hopkins, State of Texas, have invented a new compound of medicine for the cure of all inflammatory diseases of the pulmonary organs, known as "Reeves' Stimulating Expectorant;" and I do hereby declare that the following is a full and exact recipe for the compounding of the same.

I take one pound of the root of *Leptandra Virginica*, pulverized; one pound of *Asclapias tuberosa*, pulverized; one pound of the seeds of *Lobelia inflata*, pulverized; one pound of ground African ginger; one-fourth of a pound of *Capsicum* or African Cayenne pepper; one-fourth of a pound of cinnamon-bark, pulverized; one-half of a pound of *Cimicifuga* or the root of black cohosh, pulverized. I mix all thoroughly together and put up in four-ounce bottles and seal it air-tight.

My directions for use are as follows: Take one table-spoonful of the compound. Add to it a pint of boiling water. Let it steep one hour in an earthen covered vessel. Then pour it off, and add to the infusion four table-spoonfuls of honey. Shake well, and use it while warm.

Dose: For an adult, three table-spoonfuls of the sirup every hour until relief is found. For children from one to three years old, one table-spoonful, as above, and for infants, a tea-spoonful diluted and given as above directed.

Now, what I claim as my discovery, and for which I desire Letters Patent, is—

The medical compound above described.

J. J. REEVES.

Witnesses:
SAML. OURAND,
A. B. JONES.